(12) United States Patent
Shao et al.

(10) Patent No.: US 11,393,458 B2
(45) Date of Patent: Jul. 19, 2022

(54) METHOD AND APPARATUS FOR SPEECH RECOGNITION

(71) Applicant: BEIJING BAIDU NETCOM SCIENCE AND TECHNOLOGY CO., LTD., Beijing (CN)

(72) Inventors: Junyao Shao, Beijing (CN); Sheng Qian, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 296 days.

(21) Appl. No.: 16/702,326

(22) Filed: Dec. 3, 2019

(65) Prior Publication Data

US 2020/0365144 A1    Nov. 19, 2020

(30) Foreign Application Priority Data

May 16, 2019  (CN) .......................... 201910405521.8

(51) Int. Cl.
  *G10L 15/00*  (2013.01)
  *G10L 15/18*  (2013.01)
  *G10L 15/02*  (2006.01)
  *G10L 15/06*  (2013.01)
  *G10L 15/22*  (2006.01)
  *G10L 15/30*  (2013.01)

(52) U.S. Cl.
  CPC .............. *G10L 15/18* (2013.01); *G10L 15/02* (2013.01); *G10L 15/063* (2013.01); *G10L 15/22* (2013.01); *G10L 15/30* (2013.01); *G10L 2015/223* (2013.01)

(58) Field of Classification Search
CPC combination set(s) only.
See application file for complete search history.

(56) References Cited

U.S. PATENT DOCUMENTS 7,542,897 B2 *  6/2009  Hutchison ............... G10L 19/00
                                              704/201
9,437,186 B1 *  9/2016  Liu ........................ G10L 15/05

FOREIGN PATENT DOCUMENTS

| CN | 103165127 A | 6/2013 |
| CN | 104751852 A | 7/2015 |
| CN | 106710606 A | 5/2017 |
| CN | 107564512 A | 1/2018 |
| CN | 108877776 A | 11/2018 |
| JP | H01260496   | 10/1989 |

(Continued)

OTHER PUBLICATIONS

Quan et al., "Gunshot recognition of BP neural network", Audio engineering, vol. 42, No. 2—4 pages (2018).

*Primary Examiner* — Vu B Hang
(74) *Attorney, Agent, or Firm* — Knobbe, Martens, Olson & Bear LLP

(57) ABSTRACT

Embodiments of the present disclosure relate to a method and apparatus for speech recognition. The method includes: determining, based on an acoustic score of a speech frame in a speech signal, a non-silence frame in the speech signal; determining a buffer frame between adjacent non-silence frames based on the acoustic score of the speech frame, a modeling unit corresponding to the buffer frame characterizing a beginning or end of a sentence; and decoding a speech frame after removing the buffer frame from the speech signal, to obtain a speech recognition result.

9 Claims, 4 Drawing Sheets

(56) References Cited

FOREIGN PATENT DOCUMENTS

| | | |
|---|---|---|
| JP | 4484283 B2 | 6/2010 |
| JP | 2012048119 A | 3/2012 |
| JP | 2013182150 A | 9/2013 |
| JP | 6336219 B1 | 6/2018 |
| JP | 6462936 B1 | 1/2019 |
| JP | 2019020685 A | 2/2019 |
| WO | WO2015/059947 | 4/2015 |
| WO | 2018173293 A1 | 9/2018 |

* cited by examiner

METHOD AND APPARATUS FOR SPEECH RECOGNITION

CROSS-REFERENCE TO RELATED APPLICATION

This application claims priority to Chinese Application No. 201910405521.8, filed on May 16, 2019 and entitled "Method and Apparatus for Speech Recognition," the entire disclosure of which is hereby incorporated by reference.

TECHNICAL FIELD

Embodiments of the present disclosure relate to the field of computer technology, and specifically to a method and apparatus for speech recognition.

BACKGROUND

Speech recognition is an important research direction of artificial intelligence technology. In the process of a speech recognition algorithm, first, an acoustic feature is extracted to compute an acoustic score, and then each speech frame is decoded by a decoder in the time dimension based on the acoustic score, an appropriate language model score is added based on a decoding path, and a best decoding path is selected after completing decoding a last frame to be a recognition result.

Decoding speed of the decoder has a great influence on the speed of the speech recognition system. Optimizing the decoding speed of the decoder may not only improve the user experience, but also reduce the operation pressure of the system.

SUMMARY

Embodiments of the present disclosure present a method and apparatus for speech recognition.

In a first aspect, an embodiment of the present disclosure provides a method for speech recognition, including: determining, based on an acoustic score of a speech frame in a speech signal, a non-silence frame in the speech signal; determining a buffer frame between adjacent non-silence frames based on the acoustic score of the speech frame, a modeling unit corresponding to the buffer frame characterizing a beginning or end of a sentence; and decoding a speech frame after removing the buffer frame from the speech signal, to obtain a speech recognition result.

In some embodiments, the acoustic score includes a first acoustic score and at least one second acoustic score, the first acoustic score characterizing a probability of the speech frame corresponding to a blank modeling unit, the second acoustic score characterizing a probability of the speech frame corresponding to a preset non-blank modeling unit; and the determining, based on an acoustic score of a speech frame in a speech signal, a non-silence frame in the speech signal includes: determining the non-silence frame in the speech signal based on a difference between the first acoustic score and the second acoustic score of the speech frame in the speech signal.

In some embodiments, the determining the non-silence frame in the speech signal based on a difference between the first acoustic score and the second acoustic score of the speech frame in the speech signal includes: determining the speech frame to be the non-silence frame, in response to determining a gap between the first acoustic score and a maximum value of second acoustic scores of the speech frame being smaller than or equal to a first preset threshold.

In some embodiments, the determining the non-silence frame in the speech signal based on a difference between the first acoustic score and the second acoustic score of the speech frame in the speech signal includes: annotating the speech frame as a silence frame, in response to determining a gap between the first acoustic score and a maximum value of second acoustic scores of the speech frame being greater than or equal to a second preset threshold; and determining a speech frame that is not annotated as the silence frame in the speech signal to be the non-silence frame.

In some embodiments, the method further includes: determining a silence frame in the speech signal based on the acoustic score of the speech frame in the speech signal; and the decoding a speech frame after removing the buffer frame from the speech signal includes: decoding a speech frame after removing the buffer frame and the silence frame from the speech signal.

In a second aspect, an embodiment of the present disclosure provides an apparatus for speech recognition, including: a first determining unit configured to determine, based on an acoustic score of a speech frame in a speech signal, a non-silence frame in the speech signal; a second determining unit configured to determine a buffer frame between adjacent non-silence frames based on the acoustic score of the speech frame, a modeling unit corresponding to the buffer frame characterizing a beginning or end of a sentence; and a decoding unit configured to decode a speech frame after removing the buffer frame from the speech signal, to obtain a speech recognition result.

In some embodiments, the acoustic score includes a first acoustic score and at least one second acoustic score, the first acoustic score characterizing a probability of the speech frame corresponding to a blank modeling unit, the second acoustic score characterizing a probability of the speech frame corresponding to a preset non-blank modeling unit; and the first determining unit is further configured to: determine the non-silence frame in the speech signal based on a difference between the first acoustic score and the second acoustic score of the speech frame in the speech signal.

In some embodiments, the first determining unit is further configured to determine the non-silence frame in the speech signal by: determining the speech frame to be the non-silence frame, in response to determining a gap between the first acoustic score and a maximum value of second acoustic scores of the speech frame being smaller than or equal to a first preset threshold.

In some embodiments, the first determining unit is further configured to determine the non-silence frame in the speech signal by: annotating the speech frame as a silence frame, in response to determining a gap between the first acoustic score and a maximum value of second acoustic scores of the speech frame being greater than or equal to a second preset threshold; and determining a speech frame that is not annotated as the silence frame in the speech signal to be the non-silence frame.

In some embodiments, the apparatus further includes: a third determining unit configured to determine a silence frame in the speech signal based on the acoustic score of the speech frame in the speech signal; and the decoding unit is further configured to: decode a speech frame after removing the buffer frame and the silence frame from the speech signal.

In a third aspect, an embodiment of the present disclosure provides a device including: one or more processors; and a storage unit configured to store one or more programs, where the one or more programs, when executed by the one or more processors, cause the one or more processors to implement the method for speech recognition according to the first aspect.

In a fourth aspect, an embodiment of the present disclosure provides a computer readable medium, storing a computer program thereon, where the computer program, when executed by a processor, implements the method for speech recognition according to the first aspect.

The method and apparatus for speech recognition of embodiments of the present disclosure determine, based on an acoustic score of a speech frame in a speech signal, a non-silence frame in the speech signal, determine a buffer frame between adjacent non-silence frames based on the acoustic score of the speech frame, a modeling unit corresponding to the buffer frame characterizing a beginning or end of a sentence, and decode a speech frame after removing the buffer frame from the speech signal, to obtain a speech recognition result, thereby effectively reducing the number of to-be-decoded speech frames, reducing the operation pressure of a decoder, and enhancing the decoding speed, thus enhancing the speech recognition speed.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
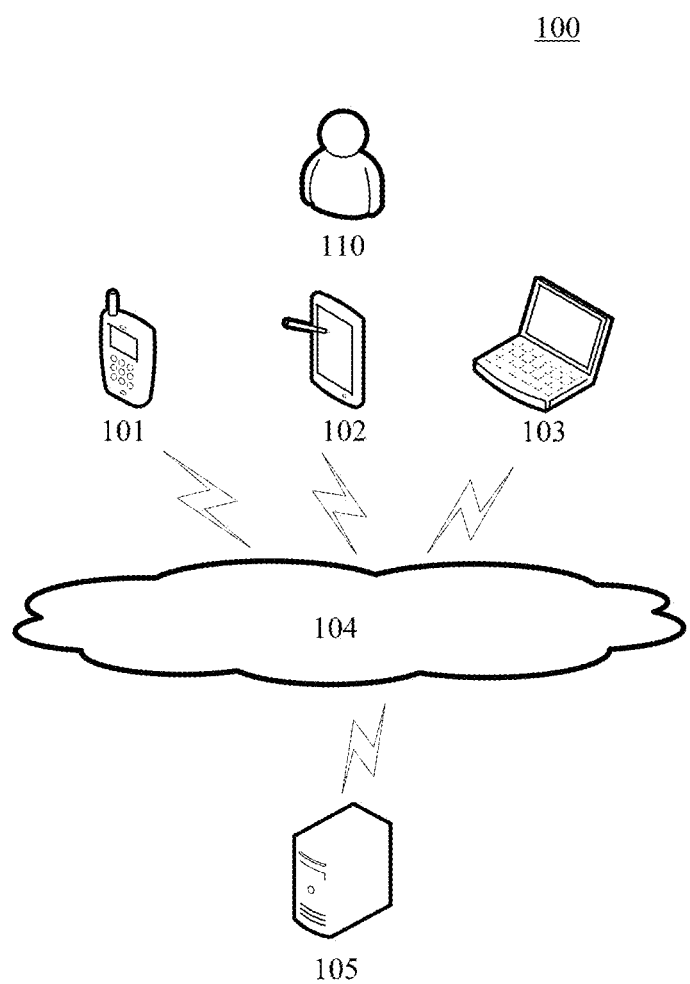
FIG. 1 is a diagram of an example system architecture in which embodiments of the present disclosure may be implemented.

FIG. 1 shows an example system architecture 100 in which a method for speech recognition or an apparatus for speech recognition of embodiments of the present disclosure may be implemented.

As shown in FIG. 1, the system architecture 100 may include terminal devices 101, 102, 103, a network 104, and a server 105. The network 104 serves as a medium providing a communication link between the terminal devices 101, 102, 103, and the server 105. The network 104 may include various types of connections, such as wired or wireless communication links, or optical cables.

The terminal devices 101, 102, 103 may interact with the server 105 via the network 104, for example, to receive or send a text or audio message. The terminal devices 101, 102, or 103 may be provided with various information interaction applications, such as a voice assistant application, an information search application, a map application, a social platform application, and an audio/video playing application.

The terminal devices 101, 102, or 103 may be devices with an audio signal collection function, and may be various electronic devices having a microphone and supporting Internet access, including but not limited to a smart speaker, a smart phone, a tablet computer, a smart watch, a notebook computer, a laptop portable computer, and an e-book reader.

The server 105 may be a server providing an audio signal processing service, e.g., a speech recognition server. The server 105 may analyze a speech signal sent by the terminal devices 101, 102, or 103, and convert the speech signal into a corresponding text via a speech recognition algorithm. The server 105 may return a speech signal recognition result to the terminal devices 101, 102, or 103 via the network 104.

It should be noted that the method for speech recognition provided by some embodiments of the present disclosure may be executed by the server 105. Accordingly, the apparatus for speech recognition may be provided in the server 105.

It should be noted that the server may be hardware or software. When the server is hardware, the server may be implemented as a distributed server cluster composed of a plurality of servers, or be implemented as a single server. When the server is software, the server may be implemented as a plurality of software programs or software modules (e.g., a plurality of software modules for providing distributed services), or may be implemented as a single software program or software module. This is not specifically limited here.

When the terminal device includes a component for executing a physical operation (e.g., a processor such as GPU), the method for speech recognition provided by some embodiments of the present disclosure may be further executed by the terminal devices 101, 102, or 103. Accordingly, the apparatus for speech recognition may be provided in the terminal devices 101, 102, or 103.

It should be understood that the numbers of terminal devices, networks, and servers in FIG. 1 are merely illustrative. Any number of terminal devices, networks, and servers may be provided based on actual requirements.

Figure 2:
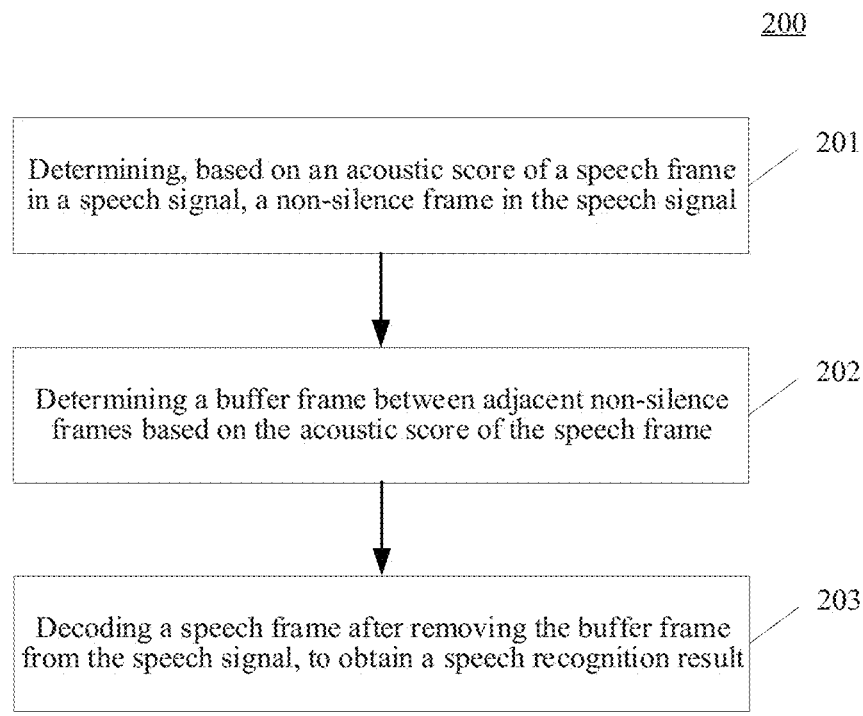
FIG. 2 is a flowchart of a method for speech recognition according to an embodiment of the present disclosure.

Further referring to FIG. 2, a process 200 of a method for speech recognition according to an embodiment of the present disclosure is shown. The method for speech recognition includes the following steps.

Step 201: determining, based on an acoustic score of a speech frame in a speech signal, a non-silence frame in the speech signal.

In the present embodiment, an executing body of the method for speech recognition may acquire the speech signal. The speech signal is a to-be-recognized speech signal, and is a signal generated by signal collection of a sound sent by a speaker using a sound collecting component. An acoustic feature of the speech signal may be extracted. The acoustic feature may be a feature characterizing a timing sequence characteristic or frequency characteristic of the speech signal. Specifically, the time-domain speech signal may be converted into a frequency domain signal, and spectrum features thereof may be extracted. For example, fundamental frequency feature, Mel-frequency feature, or the like, may be extracted.

The speech signal is a time-continuous signal, and may be segmented into a plurality of speech frames in accordance with a certain time period, i.e., the speech signal may be formed by connecting speech frames with a fixed time length in a time dimension. In the present embodiment, the acoustic feature extraction may be extracting features characterizing intensities or frequency characteristics of the speech frames.

After extracting the acoustic feature, the acoustic score may be given using an acoustic model. The acoustic model may be modeled on acoustic feature distribution based on a GMM (Gaussian Mixed Model) or a hidden Markov model, and is used for mapping the acoustic feature to a corresponding acoustic modeling unit and compute a score corresponding to each acoustic modeling unit. The acoustic feature may be inputted into the acoustic model, to obtain acoustic scores corresponding to different acoustic modeling units. Here, the acoustic modeling unit may include a non-blank modeling unit and a blank modeling unit. The non-blank modeling unit may correspond to a smallest pronouncing unit, for example, correspond to a phoneme. As an example, an initial consonant or a compound vowel of a Chinese syllable is a phoneme, and each non-blank modeling unit corresponds to an initial consonant or a compound vowel; and the blank modeling unit represents silence or non-speech.

In the present embodiment, the non-silence frame may be determined based on an acoustic score of each speech frame. The non-silence frame is a speech frame containing audio information generated by pronunciation of the speaker, and corresponds to a non-blank modeling unit. Specifically, whether the speech frame is the non-silence frame may be determined by various approaches based on acoustic scores of the speech frame corresponding to different acoustic modeling units. In some alternative implementations, if an acoustic score of a speech frame corresponding to any non-blank modeling unit is higher than a preset threshold, then the speech frame may be determined to be the non-silence frame; or if acoustic scores of a speech frame corresponding to at least two non-blank modeling units are higher than 0, then the speech frame may be determined to be the non-silence frame.

In some alternative implementations of the present embodiment, the acoustic score of the speech frame may include a first acoustic score and at least one second acoustic score. The first acoustic score characterizes a probability of the speech frame corresponding to a blank modeling unit, and the second acoustic score characterizes a probability of the speech frame corresponding to a preset non-blank modeling unit. Here, different second acoustic scores of the same speech frame characterize probabilities of the speech frame corresponding to different non-blank modeling units. Here, the non-silence frame in the speech signal may be determined based on a difference between the first acoustic score and the second acoustic score of the speech frame in the speech signal.

In practice, if the difference between the first acoustic score and the second acoustic score is great, then a difference between a probability of the speech frame corresponding to a blank modeling unit and a probability of the speech frame corresponding to a non-blank modeling unit is great, and then an error generated from determining the speech frame to be a non-silence frame or silence frame is small; while if the difference between the first acoustic score and the second acoustic score is small, then a difference between a probability of the speech frame corresponding to a blank modeling unit and a probability of the speech frame corresponding to a non-blank modeling unit is small, and then an error generated from determining the speech frame to be a non-silence frame or silence frame is great.

Specifically, in some alternative implementations, the speech frame may be determined to be the non-silence frame, in response to determining a gap between the first acoustic score and a maximum value of second acoustic scores of the speech frame being smaller than or equal to a first preset threshold. That is, when the gap between the first acoustic score and each second acoustic score of the speech frame is smaller than the first preset threshold, a difference between a probability of the speech frame being the silence frame and a probability of the speech frame being the non-silence frame is small, and the speech frame may be determined to be the non-silence frame.

In some other alternative implementations, in response to determining the gap between the first acoustic score and the maximum value of second acoustic scores of the speech frame being greater than or equal to a second preset threshold, the speech frame may be annotated as the silence frame, and a speech frame that is not annotated as the silence frame in the speech signal may be determined to be the non-silence frame. In this implementation, first, a speech frame with the gap between the first acoustic score and each second acoustic score being greater than or equal to the second preset threshold may be determined to be the silence frame, and then other speech frames except for the silence frame are determined to be non-silence frames.

The first preset threshold and the second preset threshold may be set based on statistic results or experiences, and the first preset threshold may be equal to the second preset threshold.

As an example, Table I shows the gap between the first acoustic score and the maximum value of second acoustic scores of speech frames (numbered 1 to 14) in a segment of speech signal "The weather of today." The first line represents serial numbers of speech frames, the second line represents a modeling unit with a highest acoustic score of each speech frame (here, e.g., taking an individual word as the modeling unit), and the third line represents the gap between the first acoustic score and the maximum value of second acoustic scores corresponding to each speech frame.

TABLE I

Acoustic Scores of Speech Frames

| S | | | | | | | | N | | | | | | | |
|---|---|---|---|---|---|---|---|---|---|---|---|---|---|---|---|
|   | 0 | 1 | 2 | 3 | 4 | 5 | 6 | 7 | 8 | 9 | 10 | 11 | 12 | 13 | 14 |
| Modeling unit | <s> | B | B | the | B | weather | B | B | of | today | B | B | B | B | </s> |
| gap | -1 | 5 | 6 | -5 | 3 | -4 | 5 | 8 | -1 | -5 | 2 | 4 | 5 | 7 | -2 |

"<s>" and "</s>" represent a modeling unit corresponding to a beginning of a sentence and an end of the sentence, and "B" represents a blank modeling unit. Assuming that the first preset threshold and the second preset threshold are 4, speech frames with the gap smaller than or equal to 4, i.e., 0th, 3rd, 4th, 5th, 8th, 9th, 10th, 11th, and 14th frames are determined to be non-silence frames, and speech frames with the gap greater than 4, i.e., 1st, 2nd, 6th, 7th, 12th, 13th frames are determined to be silence frames.

Step 202: determining a buffer frame between adjacent non-silence frames based on the acoustic score of the speech frame.

A modeling unit corresponding to the buffer frame characterizes a beginning or end of a sentence. In an example of the above Table I, the 1st and 14th frames are "<s>" and "</s>" respectively, and represent the beginning and end of the sentence respectively. In order to ensure that "<s>" and "</s>" can be skipped at any position in the speech signal, two buffer frames may be reserved after each non-silence frame.

In the present embodiment, the two reserved speech frames after the non-silence frame may be determined to be the buffer frames based on the non-silence frame determined in step 201. If a Chinese character is taken as the modeling unit, and each Chinese character corresponds to a speech frame, then two frames after each non-silence frame maybe determined to be the buffer frames. If phonemes, such as an initial consonant and a compound vowel, are taken as modeling units, each phoneme corresponds to a speech frame, and two frames after a non-silence frame sequence formed by combining non-silence frames corresponding to at least one phoneme may be used as the buffer frames. For example, two frames after a non-silence frame sequence "ni" formed by combining non-silence frames corresponding to "n" and "i" are determined to be the buffer frames.

Step 203: decoding a speech frame after removing the buffer frame from the speech signal, to obtain a speech recognition result.

The speech signal maybe decoded using a decoder based on the acoustic score of each speech frame. During decoding, the buffer frame may be skipped. Specifically, the acoustic score of the buffer frame may be set as 0, and a decoding path may be found in a network that is established based on a pronunciation dictionary, the acoustic model, and a language model, to obtain a path with a highest probability as a speech recognition result. Alternatively, the buffer frame may be deleted from the speech signal, and a sequence formed by remaining speech frames is decoded frame by frame.

Alternatively, the buffer frame may be annotated, and if a current frame is detected to be annotated as a buffer frame during frame-by-frame decoding, then the current frame may be skipped, and then the next frame is decoded.

The buffer frame is skipped during decoding, thereby reducing the number of to-be-decoded speech frames. Thus, the method for speech recognition of embodiments of the present disclosure can reduce the operation pressure of a decoder, and enhance the decoding speed, thereby enhancing the speech recognition efficiency.

Figure 3:
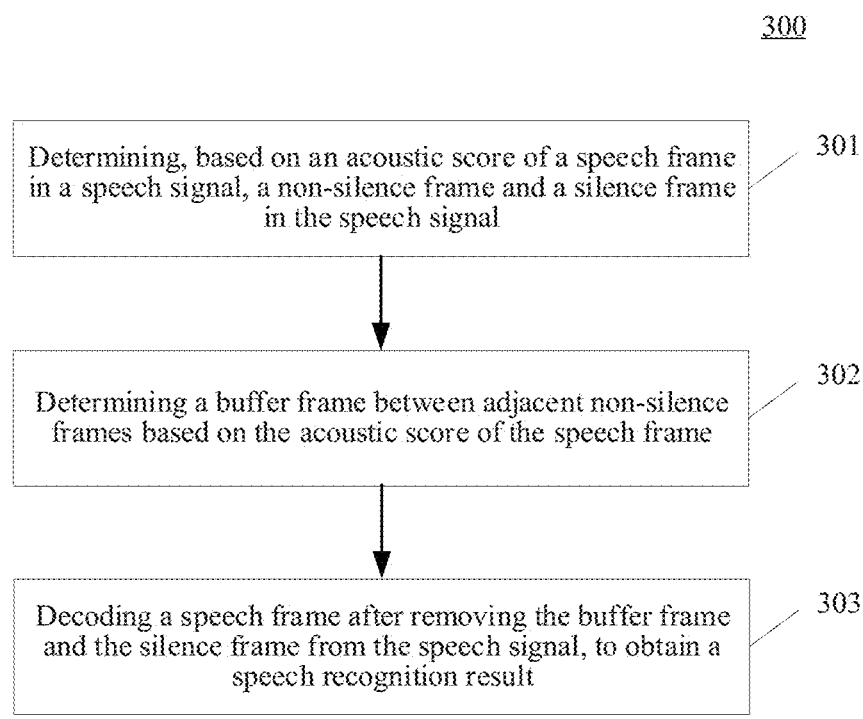
FIG. 3 is a flowchart of the method for speech recognition according to another embodiment of the present disclosure.

Further referring to FIG. 3, a flowchart of the method for speech recognition according to another embodiment of the present disclosure is shown. As shown in FIG. 3, a process 300 of the method for speech recognition includes the following steps.

Step 301: determining, based on an acoustic score of a speech frame in a speech signal, a non-silence frame and a silence frame in the speech signal.

In the present embodiment, an executing body of the method for speech recognition may acquire the speech signal, extract an acoustic feature of the speech signal, and input the acoustic feature into an acoustic model for scoring, to obtain the acoustic score of the speech frame. Here, the acoustic score of the speech frame may include acoustic scores of the speech frame corresponding to different acoustic modeling units. The acoustic modeling unit may include a blank modeling unit and a non-blank modeling unit. The non-blank modeling unit corresponds to a phoneme or a Chinese character (an individual word), and the blank modeling unit may represent silence. The acoustic score may include an acoustic score of the speech frame corresponding to each preset non-blank modeling unit and an acoustic score of the speech frame corresponding to a blank modeling unit.

In the present embodiment, whether the speech frame is the silence frame or non-silence frame may be determined by various approaches based on the acoustic score of the speech frame corresponding to each preset non-blank modeling unit and the acoustic score of the speech frame corresponding to the blank modeling unit. In an alternative implementation, whether the speech frame is the silence frame may be determined based on a modeling unit with a highest acoustic score corresponding to each speech frame. For example, acoustic scores of the speech frame corresponding to a blank modeling unit 1, a non-blank modeling unit 1, a non-blank modeling unit 2, . . . are: S1, S2, S3, . . . , successively, and if the maximum value thereof is S1, then the acoustic score of the speech frame corresponding to the blank modeling unit is highest, and the speech frame maybe determined to be the silence frame; while if the maximum value thereof is S2, then the acoustic score of the speech frame corresponding to a non-blank modeling unit is highest, and the speech frame may be determined to be the non-silence frame.

In another alternative implementation, if an acoustic score of a speech frame corresponding to any non-blank modeling unit is higher than a preset threshold, then the speech frame maybe determined to be the non-silence frame; or if acoustic scores of a speech frame corresponding to at least two non-blank modeling units are higher than 0, then the speech frame maybe determined to be the non-silence frame.

In some other alternative implementations, the acoustic score of the speech frame may include a first acoustic score and at least one second acoustic score. The first acoustic score characterizes a probability of the speech frame corresponding to a blank modeling unit, and the second acoustic score characterizes a probability of the speech frame corresponding to a preset non-blank modeling unit. Here, different second acoustic scores of the same speech frame characterize probabilities of the speech frame corresponding to different non-blank modeling units. The non-silence frame in the speech signal may be determined based on a difference between the first acoustic score and the second acoustic score of the speech frame in the speech signal. Specifically, in response to determining a gap between the first acoustic score and the maximum value of second acoustic scores of the speech frame being smaller than or equal to a first preset threshold, the speech frame may be determined to be the non-silence frame; and in response to determining the gap between the first acoustic score and the maximum value of second acoustic scores of the speech frame being greater than or equal to a second preset threshold, the speech frame may be annotated as the silence frame, and a speech frame that is not annotated as the silence frame in the speech signal may be determined to be the non-silence frame.

As an example, in the example of the above Table I, a modeling unit being "B" means that the corresponding speech frame is the silence frame, while a modeling unit being an individual word means that the corresponding speech frame is the non-silence frame.

Step 302: determining a buffer frame between adjacent non-silence frames based on the acoustic score of the speech frame.

A modeling unit corresponding to the buffer frame characterizes a beginning or end of a sentence, and may be expressed as "<s>" and "</s>." In order to ensure that "<s>" and "</s>" can be skipped at any position in the speech signal, two buffer frames may be reserved after each non-silence frame.

Step 302 in the present embodiment is consistent with step 202 in above embodiments. The description of step 202 in the above embodiments may be referred to for specific implementations of step 302. The description will not be repeated here.

Step 303: decoding a speech frame after removing the buffer frame and the silence frame from the speech signal, to obtain a speech recognition result.

The speech signal maybe decoded using a decoder based on the acoustic score of each speech frame. A sequence formed by remaining non-silence frames may be decoded using the decoder after deleting the silence frame and the buffer frame in the speech signal. Alternatively, during decoding, the buffer frame and the silence frame may be skipped. Specifically, the silence frame maybe annotated at step 301, and the buffer frame may be annotated at step 302. During frame-by-frame decoding, if a current frame is annotated as the silence frame or the buffer frame, then the current frame is skipped, and whether the next frame is the silence frame or the buffer frame is determined. If the current frame is not annotated as the silence frame or the buffer frame, then a path with a highest probability at the position of the current frame may be found by traversal based on the current frame in a network that is established based on a pronunciation dictionary, the acoustic model, and a language model. After traversing all speech frames in the speech signal to find the path, a speech recognition result is obtained.

In a practical decoding process, the number of silence frames is much larger than the number of non-silence frames, and the buffer frame and the silence frame are skipped during decoding, thereby further reducing the number of to-be-decoded speech frames, simplifying the traversal process in the network in the decoding process, and further enhancing the decoding speed.

Figure 4:
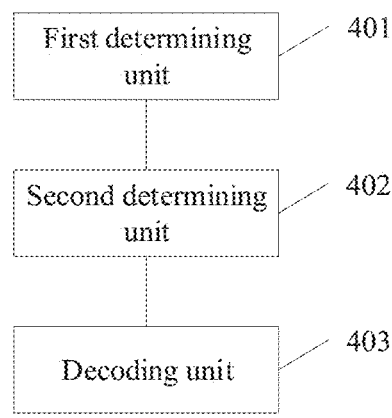
FIG. 4 is a schematic structural diagram of an apparatus for speech recognition according to an embodiment of the present disclosure.

Further referring to FIG. 4, as an implementation of the method shown in the above figures, an embodiment of the present disclosure provides an apparatus for speech recognition. An embodiment of the apparatus may correspond to an embodiment of the method shown in FIG. 2 or FIG. 3. The apparatus may be specifically applied to various electronic devices.

As shown in FIG. 4, the apparatus 400 for speech recognition of the present embodiment includes a first determining unit 401, a second determining unit 402, and a decoding unit 403. The first determining unit 401 is configured to determine, based on an acoustic score of a speech frame in a speech signal, a non-silence frame in the speech signal; the second determining unit 402 is configured to determine a buffer frame between adjacent non-silence frames based on the acoustic score of the speech frame, a modeling unit corresponding to the buffer frame characterizing a beginning or end of a sentence; and the decoding unit 403 is configured to decode a speech frame after removing the buffer frame from the speech signal, to obtain a speech recognition result.

In some embodiments, the acoustic score includes a first acoustic score and at least one second acoustic score, the first acoustic score characterizing a probability of the speech frame corresponding to a blank modeling unit, the second acoustic score characterizing a probability of the speech frame corresponding to a preset non-blank modeling unit; and the first determining unit 401 is further configured to: determine the non-silence frame in the speech signal based on a difference between the first acoustic score and the second acoustic score of the speech frame in the speech signal.

In some embodiments, the first determining unit 401 is further configured to determine the non-silence frame in the speech signal by: determining the speech frame to be the non-silence frame, in response to determining a gap between the first acoustic score and a maximum value of second acoustic scores of the speech frame being smaller than or equal to a first preset threshold.

In some implementations, the first determining unit 401 is further configured to determine the non-silence frame in the speech signal by: annotating the speech frame as a silence frame, in response to determining a gap between the first acoustic score and a maximum value of second acoustic scores of the speech frame being greater than or equal to a second preset threshold; and determining a speech frame that is not annotated as the silence frame in the speech signal to be the non-silence frame.

In some embodiments, the apparatus 400 may further include: a third determining unit configured to determine a silence frame in the speech signal based on the acoustic score of the speech frame in the speech signal; and the decoding unit 403 may be further configured to: decode a speech frame after removing the buffer frame and the silence frame from the speech signal.

The apparatus 400 for speech recognition of embodiments of the present disclosure determines, based on an acoustic score of a speech frame in a speech signal, a non-silence frame in the speech signal, determines a buffer frame between adjacent non-silence frames based on the acoustic score of the speech frame, a modeling unit corresponding to the buffer frame characterizing a beginning or end of a sentence, and decodes a speech frame after removing the buffer frame from the speech signal, to obtain a speech recognition result, thereby effectively reducing the number of to-be-decoded speech frames, reducing the operation pressure of a decoder, and enhancing the decoding speed, thus enhancing the speech recognition speed.

Figure 5:
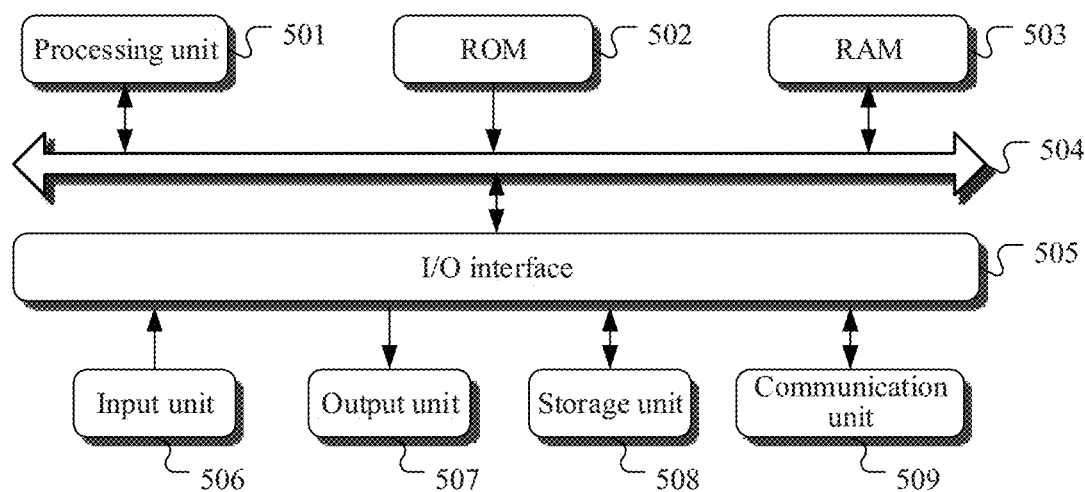
FIG. 5 is a schematic structural diagram of a computer system adapted to implement an electronic device of some embodiments of the present disclosure.

Referring to FIG. 5 below, a schematic structural diagram of an electronic device (e.g., the search engine server in FIG. 1) 500 adapted to implement some embodiments of the present disclosure is shown. The electronic device shown in FIG. 5 is merely an example, and should not limit the functions and scope of use of embodiments of the present disclosure.

As shown in FIG. 5, the electronic device 500 may include a processing unit (e.g., a central processing unit, or a graphics processor) 501, which may execute various appropriate actions and processes in accordance with a program stored in a read only memory (ROM) 502 or a program loaded into a random access memory (RAM) 503 from a storage unit 508. The RAM 503 further stores various programs and data required by operations of the electronic device 500. The processing unit 501, the ROM 502, and the RAM 503 are connected to each other through a bus 504. An input/output (I/O) interface 505 is also connected to the bus 504.

Generally, the following units may be connected to the I/O interface 505: an input unit 506 including a touch screen, a touch pad, a keyboard, a mouse, a camera, a microphone, an accelerometer, a gyroscope, or the like; an output unit 507 including a liquid crystal displayer (LCD), a speaker, a vibrator, or the like; a storage unit 508 including a hard disk, or the like; and a communication unit 509. The communication unit 509 may allow the electronic device 500 to exchange data with other devices through wireless or wired communication. While FIG. 5 shows the electronic device 500 having various units, it should be understood that it is not necessary to implement or provide all of the units shown in the figure. More or fewer units may be alternatively implemented or provided. Each block shown in FIG. 5 may represent a unit, or represent a plurality of units as required.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication unit 509, or may be installed from the storage unit 508, or may be installed from the ROM 502. The computer program, when executed by the processing unit 501, implements the above functions defined by the methods of some embodiments of the present disclosure. It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The computer readable medium may be included in the electronic device, or a stand-alone computer readable medium without being assembled into the electronic device. The computer readable medium stores one or more programs. The one or more programs, when executed by the electronic device, cause the electronic device to: determine, based on an acoustic score of a speech frame in a speech signal, a non-silence frame in the speech signal; determine a buffer frame between adjacent non-silence frames based on the acoustic score of the speech frame, a modeling unit corresponding to the buffer frame characterizing a beginning or end of a sentence; and decode a speech frame after removing the buffer frame from the speech signal, to obtain a speech recognition result.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code maybe completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flowcharts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in some embodiments of the present disclosure may be implemented by software or hardware. The described units may also be provided in a processor, for example, described as: a processor including a first determining unit, a second determining unit, and a decoding unit. The names of the units do not constitute a limitation to such units themselves in some cases. For example, the first determining may be further described as "a unit configured to determine, based on an acoustic score of a speech frame in a speech signal, a non-silence frame in the speech signal."

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for speech recognition, comprising:
   determining, based on an acoustic score of a speech frame in a speech signal, a non-silence frame in the speech signal;
   determining a buffer frame between adjacent non-silence frames based on the acoustic score of the speech frame by using a modeling unit characterizing a beginning or end of a sentence in the speech signal; and
   decoding a speech frame after removing the buffer frame from the speech signal, to obtain a speech recognition result,
   wherein the acoustic score comprises a first acoustic score and at least one second acoustic score, the first acoustic score characterizing a probability of the speech frame corresponding to a blank modeling unit, the second acoustic score characterizing a probability of the speech frame corresponding to a preset non-blank modeling unit; and
   the determining, based on an acoustic score of a speech frame in a speech signal, a non-silence frame in the speech signal comprises:
   determining the speech frame to be the non-silence frame, in response to determining a gap between the first acoustic score and a maximum value of second acoustic scores of the speech frame being smaller than or equal to a first preset threshold.

2. The method according to claim 1, wherein the determining the non-silence frame in the speech signal based on a difference between the first acoustic score and the second acoustic score of the speech frame in the speech signal comprises:
   annotating the speech frame as a silence frame, in response to determining a gap between the first acoustic score and a maximum value of second acoustic scores of the speech frame being greater than or equal to a second preset threshold; and
   determining a speech frame that is not annotated as the silence frame in the speech signal to be the non-silence frame.

3. The method according to claim 1, wherein the method further comprises:
   determining a silence frame in the speech signal based on the acoustic score of the speech frame in the speech signal; and
   the decoding a speech frame after removing the buffer frame from the speech signal comprises:
   decoding a speech frame after removing the buffer frame and the silence frame from the speech signal.

4. An apparatus for speech recognition, comprising:
   at least one processor; and
   a memory storing instructions, the instructions when executed by the at least one processor, cause the at least one processor to perform operations, the operations comprising:
   determining, based on an acoustic score of a speech frame in a speech signal, a non-silence frame in the speech signal;
   determining a buffer frame between adjacent non-silence frames based on the acoustic score of the speech frame by using a modeling unit characterizing a beginning or end of a sentence in the speech signal; and
   decoding a speech frame after removing the buffer frame from the speech signal, to obtain a speech recognition result,
   wherein the acoustic score comprises a first acoustic score and at least one second acoustic score, the first acoustic score characterizing a probability of the speech frame corresponding to a blank modeling unit, the second acoustic score characterizing a probability of the speech frame corresponding to a preset non-blank modeling unit; and
   the determining, based on an acoustic score of a speech frame in a speech signal, a non-silence frame in the speech signal comprises:
   determining the speech frame to be the non-silence frame, in response to determining a gap between the first acoustic score and a maximum value of second acoustic scores of the speech frame being smaller than or equal to a first preset threshold.

5. The apparatus according to claim 4, wherein the determining the non-silence frame in the speech signal based on a difference between the first acoustic score and the second acoustic score of the speech frame in the speech signal comprises:
   annotating the speech frame as a silence frame, in response to determining a gap between the first acoustic score and a maximum value of second acoustic scores of the speech frame being greater than or equal to a second preset threshold; and
   determining a speech frame that is not annotated as the silence frame in the speech signal to be the non-silence frame.

6. The apparatus according to claim 4, wherein the operations further comprise:
   determining a silence frame in the speech signal based on the acoustic score of the speech frame in the speech signal; and
   the decoding a speech frame after removing the buffer frame from the speech signal comprises:
   decoding a speech frame after removing the buffer frame and the silence frame from the speech signal.

7. A non-transitory computer readable medium, storing a computer program thereon, wherein the computer program, when executed by a processor, causes the processor to perform operations, the operations comprising:
   determining, based on an acoustic score of a speech frame in a speech signal, a non-silence frame in the speech signal;
   determining a buffer frame between adjacent non-silence frames based on the acoustic score of the speech frame by using a modeling unit characterizing a beginning or end of a sentence in the speech signal; and
   decoding a speech frame after removing the buffer frame from the speech signal, to obtain a speech recognition result,
   wherein the acoustic score comprises a first acoustic score and at least one second acoustic score, the first acoustic score characterizing a probability of the speech frame corresponding to a blank modeling unit, the second acoustic score characterizing a probability of the speech frame corresponding to a preset non-blank modeling unit; and the determining, based on an acoustic score of a speech frame in a speech signal, a non-silence frame in the speech signal comprises:

determining the speech frame to be the non-silence frame, in response to determining a gap between the first acoustic score and a maximum value of second acoustic scores of the speech frame being smaller than or equal to a first preset threshold.

8. The non-transitory computer readable medium according to claim 7, wherein the determining the non-silence frame in the speech signal based on a difference between the first acoustic score and the second acoustic score of the speech frame in the speech signal comprises:

annotating the speech frame as a silence frame, in response to determining a gap between the first acoustic score and a maximum value of second acoustic scores of the speech frame being greater than or equal to a second preset threshold; and determining a speech frame that is not annotated as the silence frame in the speech signal to be the non-silence frame.

9. The non-transitory computer readable medium according to claim 7, wherein the operations further comprise:

determining a silence frame in the speech signal based on the acoustic score of the speech frame in the speech signal; and the decoding a speech frame after removing the buffer frame from the speech signal comprises:

decoding a speech frame after removing the buffer frame and the silence frame from the speech signal.

* * * * *